United States Patent
Konagaya et al.

(10) Patent No.: US 7,031,605 B2
(45) Date of Patent: Apr. 18, 2006

(54) FILM FEEDING DEVICE AND IMAGE READING APPARATUS HAVING SAME

(75) Inventors: Tatsuya Konagaya, Kanagawa (JP); Tsuyoshi Tanabe, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 236 days.

(21) Appl. No.: 10/784,789

(22) Filed: Feb. 24, 2004

(65) Prior Publication Data

US 2004/0165230 A1 Aug. 26, 2004

(30) Foreign Application Priority Data

Feb. 26, 2003 (JP) .............................. 2003-048857

(51) Int. Cl.
*G03B 1/00* (2006.01)
(52) U.S. Cl. ...................... 396/284; 396/387; 242/563; 226/100; 358/487; 358/506
(58) Field of Classification Search ............... 396/284, 396/387, 612, 578, 567–569; 242/563; 226/100; 358/487, 506; 348/96
See application file for complete search history.

(56) References Cited

U.S. PATENT DOCUMENTS

| 4,797,698 | A | * | 1/1989 | Uenaka et al. .............. 396/512 |
| 5,227,827 | A | * | 7/1993 | Murakami ................... 396/567 |
| 5,542,350 | A | * | 8/1996 | Theilacker et al. .......... 101/228 |
| 6,674,508 | B1 | * | 1/2004 | Ando et al. .................... 355/40 |
| 6,965,425 | B1 | * | 11/2005 | Tanabe ......................... 355/27 |
| 2004/0179250 | A1 | * | 9/2004 | Konagaya et al. ........... 358/506 |

FOREIGN PATENT DOCUMENTS

| JP | 4-254845 A | 9/1992 |
| JP | 4-257855 A | 9/1992 |
| JP | 4-264541 A | 9/1992 |
| JP | 2693048 B2 | 9/1997 |

* cited by examiner

*Primary Examiner*—W. B. Perkey
(74) *Attorney, Agent, or Firm*—Sughrue Mion, PLLC (57) ABSTRACT

A negative film setter has film holders for having set therein films to be fed. Each of the film holders has both a detecting sensor for detecting whether a film is set therein and a lamp which is lit when a film is set in a film holder and which is not lit when a film is not set therein. Therefore, a user can determine at a glance whether or not films are set in the film holders, thus allowing the user to skillfully set a plurality of films at film setting sections. Accordingly, due to detection by the detecting sensor, the negative film setter can recognize in which film holder a film is set, and films can be fed in a sequential order.

20 Claims, 6 Drawing Sheets

FILM FEEDING DEVICE AND IMAGE READING APPARATUS HAVING SAME

CROSS-REFERENCE TO RELATED APPLICATION

This application claims priority under 35 USC 119 from Japanese Patent Application, No. 2003-48857, the disclosure of which is incorporated by reference herein.

BACKGROUND OF THE INVENTION

1. Field of the Invention

The present invention relates to a film feeding device and an image reading apparatus having the film feeding device, and more particularly to a film feeding device which is capable of feeding a film efficiently, and an image reading apparatus having the film feeding device.

2. Description of the Related Art

In a case where a negative film which has been developed is used to print images on printing paper or the like, during conveyance of a film along a carrier, a frame position-detecting section detects a position for each frame, and print operation keys are controlled to expose the printing paper or the like with light for printing that is emitted from the light source and has passed through the negative film.

Conventionally, since negative films are set, one at a time, at negative film carriers and conveyed, every time multiple negative films are to be printed sequentially, an operator has had to set the respective negative films and control the print operation keys.

In order to avoid such complexity, examples have been disclosed in which multiple negative films are set, and fed sequentially and automatically to a printer (see Japanese Patent No. 2693048, Japanese Patent Application Laid-Open Nos. 04-254845, 04-257855, and 04-264541, for example).

Japanese Patent No. 2693048 discloses a negative film feeding device in which a film holder is provided movably or fixed and a negative film is fed due to a movement of negative film take-up section. JP-A No. 04-254845 discloses a variation of an apparatus disclosed in Japanese Patent No. 2693048 and is a negative film feeding device in which a film holder section is circulatingly driven. JP-A No. 04-257855 discloses a variation of an apparatus disclosed in the JP-A No. 2693048 and is a negative film feeding device in which film holders are in a stacked state and moved downwardly. JP-A No. 04-264541 discloses a variation of an apparatus disclosed in Japanese Patent No. 2693048 and is a negative film feeding device in which a film holder is mounted to a rotational drum.

However, in setting films at a film setter, there has been a desire to be able to set films more efficiently. Further, it also has been desired to, when image reading a negative film, interrupt another negative film to perform the image reading.

Desires such as those described above have also been expressed not only by analog mini-labs where a photosensitive material is directly exposed to light transmitted through a negative film but also by digital mini-labs where image information on films has been fetched by a CCD element, and thereafter, the image information is exposed separately.

In view of the aforementioned facts, it is an object of the present invention to provide a film feeding device, which is capable of feeding films efficiently, and an image reading apparatus having the same.

SUMMARY OF THE INVENTION

A first aspect of the present invention is a film feeding device comprising a plurality of film holders for feeding films which are set therein, wherein each of the plurality of film holders comprises a film-presence detecting section for detecting whether or not a film is set, and a film-presence indicating section for indicating a presence of the set film upon receipt of a signal from the film presence and absence detecting section.

In this way, a user can determine at a glance whether or not a film is set, and is able to skillfully set a plurality of films at film setting portions. Further, the film feeding device can recognize in which film holder films are set by the film presence detecting section, and feed films in a sequential order.

A type of film is not limited to a negative film, and instead, a reversal film (positive film), a black and white film, or a sepia film can be used.

A second aspect of the present invention is a film feeding device including a plurality of film holders for feeding films which are set therein, the film feeding device comprising a holding mechanism for holding the plurality of film holders so that a position at which a film is fed can be fixed, a determination section for determining, in which film holder a film to be processed last is set, and a display section for displaying a film holder in which no film is set in a closest vicinity of a film holder that was determined by the determination section to have set therein the film to be processed last.

When an additional film is set in the film holder displayed by the aforementioned display section, after a film which is scheduled to be processed last has been fed, the holding mechanism moves the film holder having the additional film which is set therein and controls a position at which a film is fed, and then feeds the additional film. Accordingly, time taken for moving film holders can be reduced. Further, when a user sets a film additionally, the user can set the film in a film holder displayed by the display section, thus making it more convenient to set an additional film in a film holder.

The holding mechanism can be structured such that a film holder is movable in a direction orthogonal to a direction in which a film is fed, whereby a structure or an operation of the holding mechanism is not particularly limited.

A third aspect of the present invention is the film feeding device, wherein at least one of the plurality of film holders is an interruption holder in which a film to be processed for interruption is set.

Consequently, the present invention exerts an excellent effect in that a film to be processed for interruption can be set in a simple manner and for a reduced period of time.

A fourth aspect of the present invention is a film feeding device, wherein each of the plurality of film holders has a switch for instructing an interruption processing.

In a similar manner to a case of an ordinary processing, a film to be processed for interruption can be set in any film holder.

A fifth aspect of the present invention is a film feeding device further comprising a storage section for storing a sequential order in which films have been set in the plurality of film holders, wherein films are fed in accordance with the sequential order stored in the storage section, and when a film to be processed for interruption is set, the film to be processed for interruption is fed with priority to other films.

Accordingly, films can be fed in a sequential order in which the films have been set, thus facilitating a user to feed films as desired. Further, when an interruption processing is instructed, in accordance with the instruction, an order in which the films are processed can be changed, thus enabling a film to be processed for interruption, to be fed with priority to other films.

A sixth aspect of the present invention is an image reading apparatus which has a film feeding device according to one of the first to fifth aspects of the present invention, and which reads an image of a film fed from the film feeding device.

As a result, images of films which have been fed more efficiently can be read sequentially, thus making it possible to reduce time taken for reading images.

DETAILED DESCRIPTION OF THE INVENTION

Below, a negative film setter for feeding a negative film as a film (film feeding device) and an image reading apparatus having the film feeding device, according to embodiments of the present invention will described.

(First Embodiment)

Figure 1:
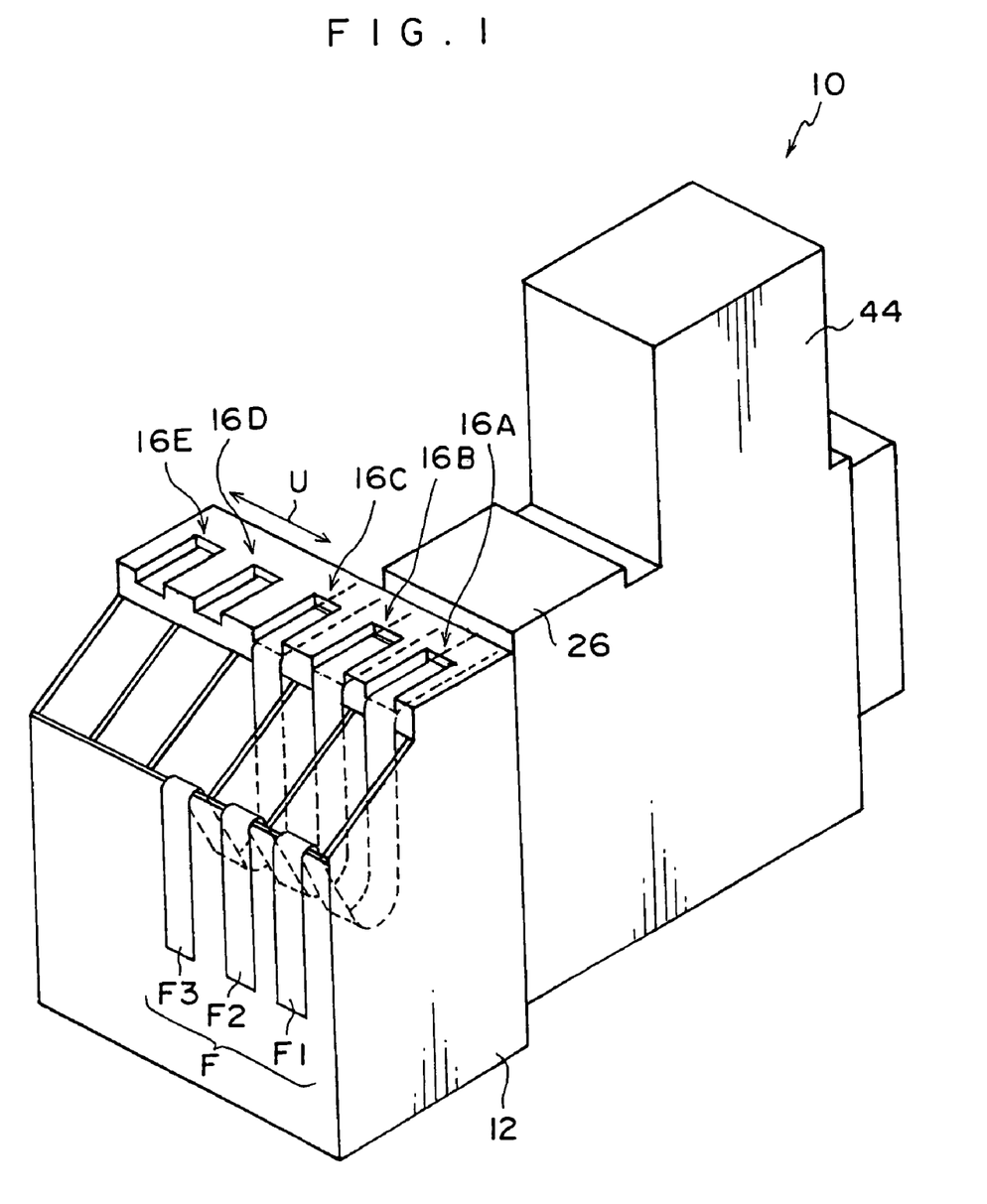
FIG. 1 is a perspective view of an image reading apparatus according to a first embodiment of the present invention.
Figure 2:
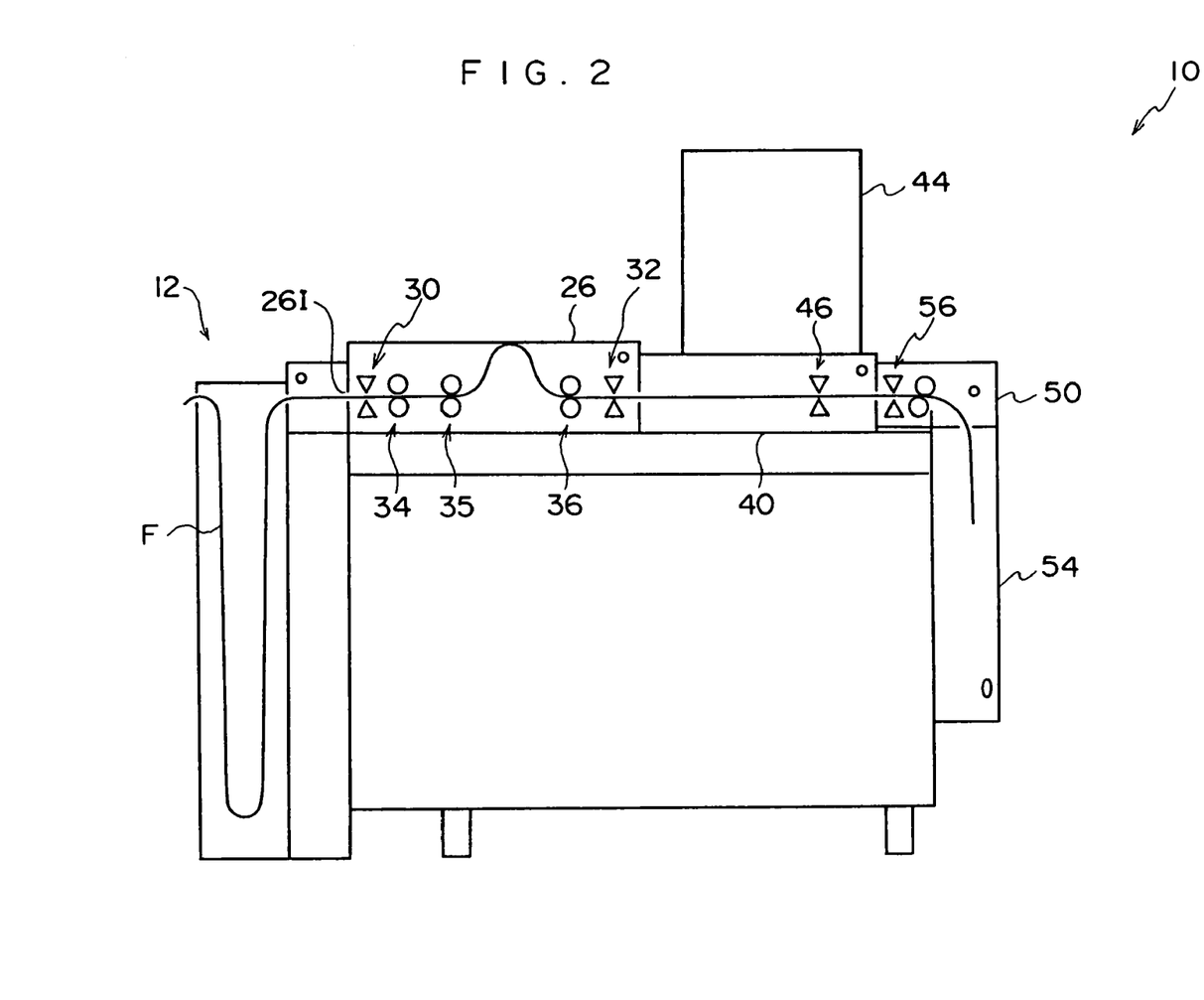
FIG. 2 is a cross-sectional side view illustrating a structure of the image reading apparatus according to a first embodiment of the present invention.
Figure 3:
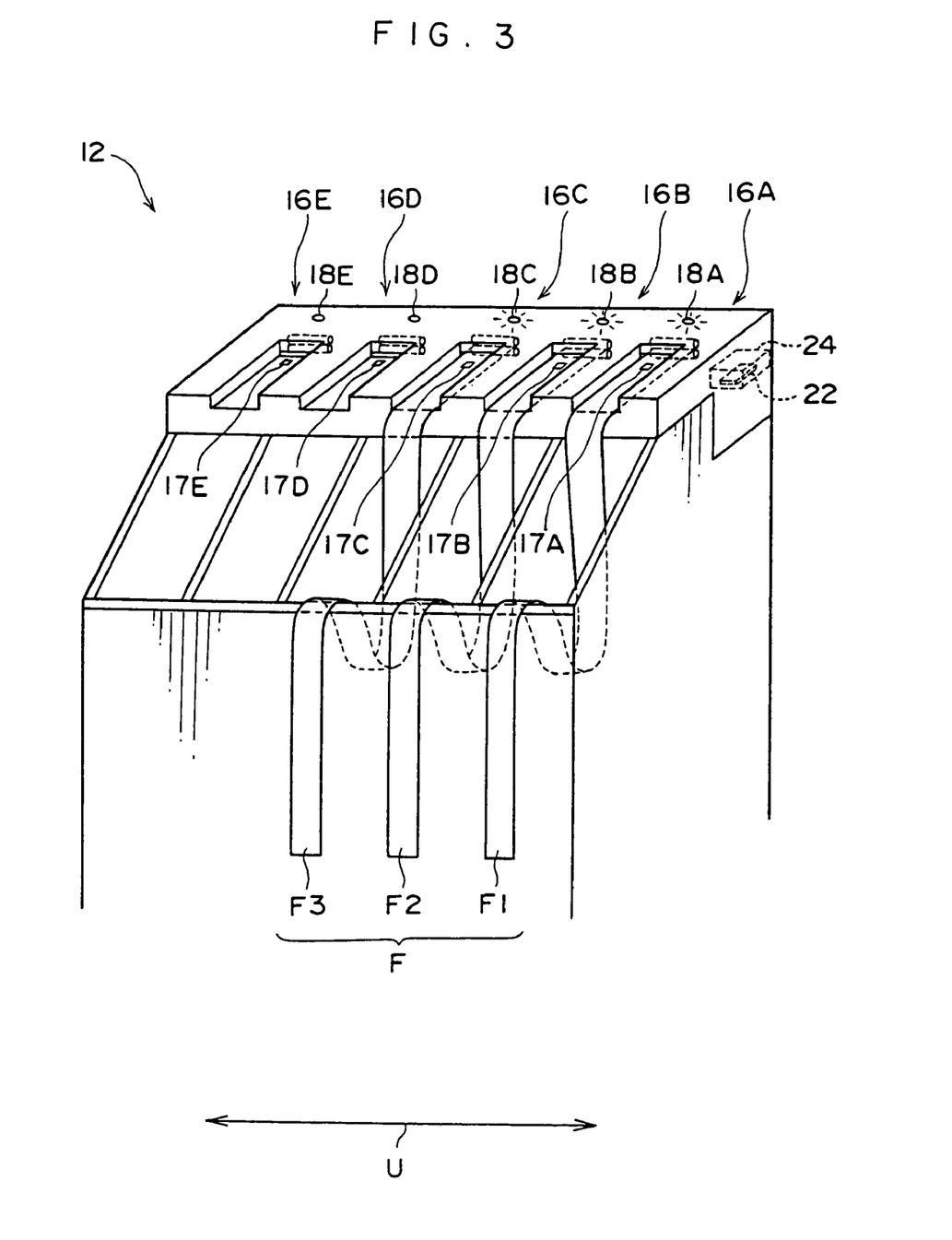
FIG. 3 is a perspective view illustrating a negative film-setter of the image reading apparatus according to the first embodiment of the present invention.

As shown in FIGS. 1 to 3, an image reading apparatus 10 according to a first embodiment of the present invention has a negative film setter 12 in which a plurality of negative films F (hereinafter, simply referred to as "film F") can be set.

As shown in FIG. 3, the negative film setter 12 has five film holders 16A to 16E, and film insertion ports for the respective film holders 16A to 16E are provided at an upper portion of the negative film setter 12. Further, detection sensors 17A to 17E are disposed at the respective film holders 16A to 16E, and detect a presence or absence of a film, namely, whether or not a film is set, in each of the film holders 16A to 16E.

Further, lamps 18A to 18E are provided at respective upper portions of the film holders 16A to 16E. In response to the results of detection by the detection sensors 17A to 17E, the lamps 18A to 18E are lit when films are set in the film holders 16A to 16E, and the lamps 18A to 18E are not lit when films are not set in the film holders 16A to 16E. The negative film setter 12 is slidingly movable in a U direction and feeds films which are set in the respective film holders 16A to 16E.

The negative film setter 12 also has a controller 24. The controller 24 accommodates therein a memory 22 for receiving signals from the detection sensors 17A to 17E and storing a sequential order in which films have been set.

Further, the image reading apparatus 10 has a negative film feeder 26 which is connected to a downstream side of the negative film setter 12. The negative film feeder 26 comprises an upstream-side leading and trailing edge detecting sensor 30 and a downstream-side leading and trailing edge detecting sensor 32 which prevent films from interfering with each other when multiple films are sent continuously. Moreover, the negative film feeder 26 has feeding rollers 34, 35, and 36 disposed between the upstream-side leading and trailing edge detecting sensor 30 and the downstream-side leading and trailing edge detecting sensor 32. The film is looped between the feeding rollers 35 and 36.

The image reading apparatus 10 has a carrier 40 which is connected to a downstream side of the negative film feeder 26. Further, the carrier 40 has therein a carrier internal sensor 46. When a film passes through the carrier internal sensor 46, a negative film catcher 50, which will be described later, feeds the film to a negative film receiving box 54.

In the image reading apparatus 10, an image reading section 44 for reading a film image is disposed at a position at a further downstream side of the downstream side leading and trailing edge detecting sensor 32.

The negative film catcher 50 is connected to the carrier 40 at a downstream side thereof, and the negative film receiving box 54 is connected to a downstream side of the negative film catcher 50. The negative film catcher 50 is provided with a feeding trigger sensor 56. When the feeding trigger sensor 56 detects passage of a trailing edge of a film, the film is fed into the negative film receiving box 54.

An operation of the image reading apparatus 10 in which a film is fed and an image is read will be explained hereinafter.

First, a plurality of films, which are subjected to an image reading processing, is set at the negative film setter 12. As shown in FIG. 3, a case in which three films F1 to F3 are set in the negative film setter 12 will be explained hereinafter.

The respective films F1, F2, and F3 are set by a user in the film holders 16A, 16B, and 16C in a sequential order of F1, F2, and F3. Accordingly, detection signals are outputted from the detecting sensors 17A to 17C and transmitted to the controller 24 in this sequential order. This sequential order is stored in the memory 22.

On the basis of contents stored in the memory 22, the controller 24 slidingly moves the negative film setter 12 in a U direction and stops the negative film setter 24 at a predetermined position so that the film F1, which was set first, can be conveyed to a conveying port 26I of the negative film feeder 26 (see FIG. 2).

When a film feeding start button (not shown) is pressed by a user, the negative film setter 12 is controlled by the controller 24 to feed the film F1, and the film F1 is fed from the film holder 16A. A film feed rate is, for example, 330 mm/s.

After the film F1 has been fed from the negative film setter 12, on the basis of the contents stored in the memory 22, the negative film setter 12 slidingly moves in a U direction and stops the negative film setter 12 at a predetermined position so that the film F2 which was set secondly can be conveyed to the conveying port 26I of the negative film feeder 26.

The film F1 conveyed from the negative film setter 12 is conveyed to the negative film feeder 26. At the negative film feeder 26, when passage of a trailing edge of the film F1 is detected by the upstream side leading and trailing edge detecting sensor 30, the film F1 is looped between the feeding rollers 35 and 36. Further, the trailing edge of the film F1 is detected by the downstream side leading and trailing edge detecting sensor 32. A detection signal outputted from the upstream side leading and trailing edge detecting sensor 30 is transmitted to the negative film setter 12. When it receives the detection signal, the negative film setter 12 feeds the next film F2.

In the same way, in order to be able to convey the third film F3, the negative film setter 12 is moved and the film F3 is fed.

A film F, which is conveyed from the negative film feeder 26, is conveyed to the carrier 40 and the image reading section 44 reads an image of respective frames.

As described above, in the present embodiment, the negative film setter 12 feeds films (for example, three films F1 to F3) sequentially in accordance with an order in which the films have been set. Accordingly, films can be processed in a sequential order as desired by a user. Further, the lamps 18A to 18E are lit when films are set in the film holders, and the lamps are not lit when films are not set therein. Consequently, a user can determine at a glance a film holder into which a film can be set, and the convenience of usage of the negative film setter 12 is extremely good. Moreover, by using an image reading apparatus having the negative film setter 12, images can be read efficiently in a shorter period of time.

Figure 4:
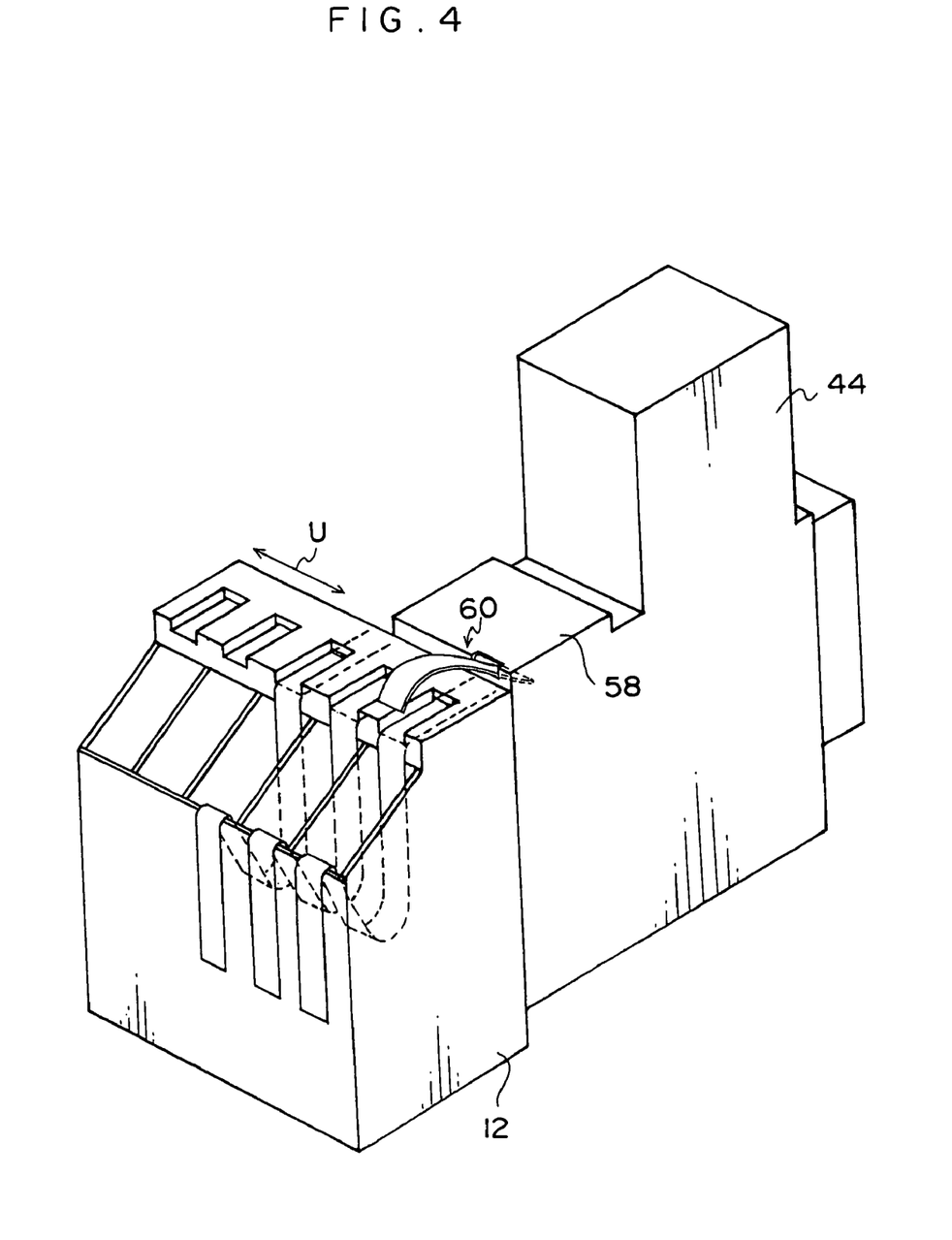
FIG. 4 is a perspective view illustrating a variant example of the image reading apparatus according to the first embodiment of the present invention.

Also, among film holders, one film holder (e.g., the film holder 16A) can be used exclusively as a holder for interruption. Accordingly, interruption processing can be easily carried out with a simple structure. Further, as shown in FIG. 4, the negative film feeder 26 can be replaced by a negative film feeder 58 which can implement an interruption processing. The negative film feeder 58 has an interrupting holder 60 for setting therein a film to be processed for interruption. Consequently, it is not necessary to move the negative film setter 12 during the interruption processing.

(Second Embodiment)

Figure 5:
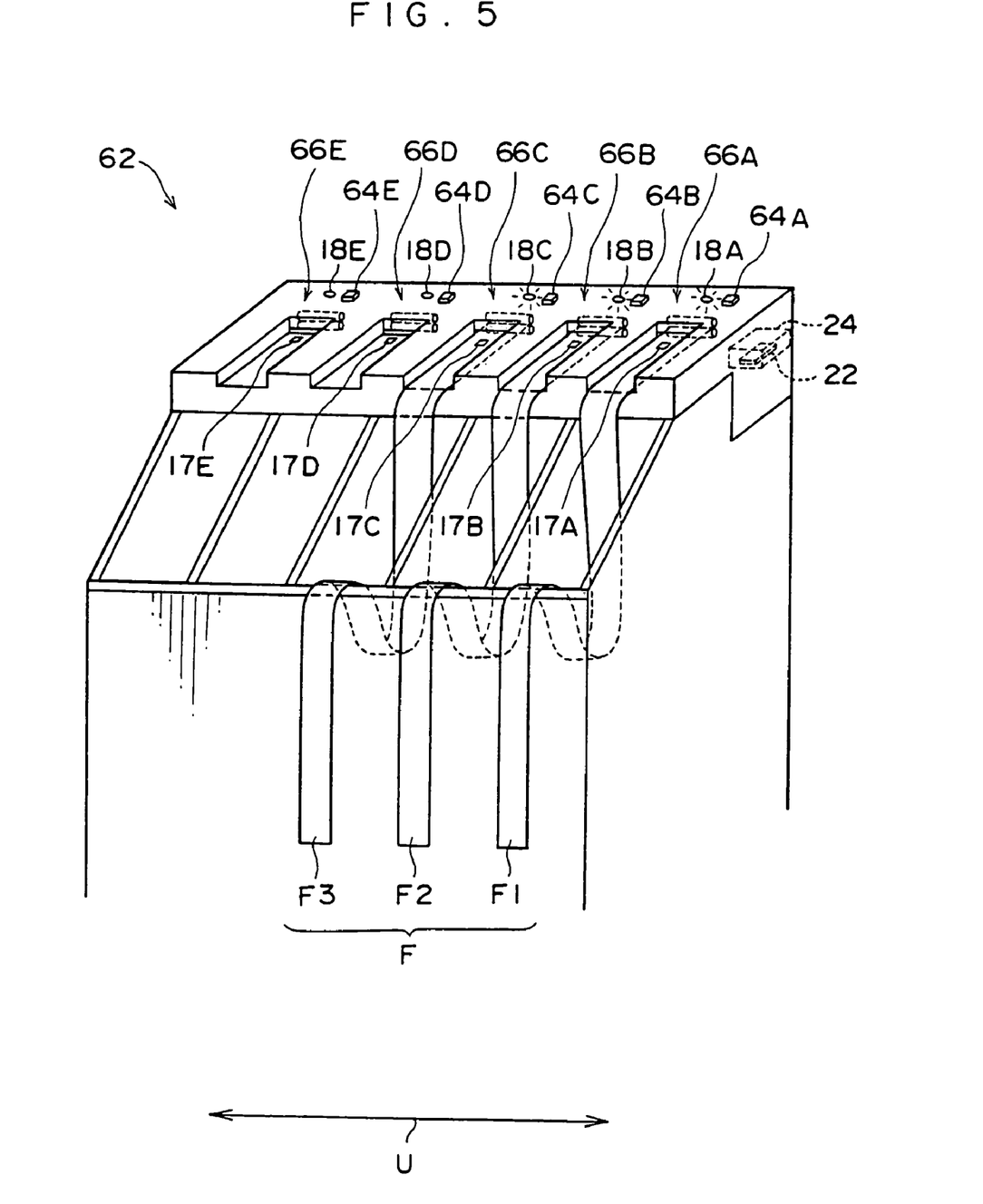
FIG. 5 is a perspective view illustrating a negative film setter of an image reading apparatus according to a second embodiment of the present invention.

As shown in FIG. 5, an image reading apparatus according to a second embodiment of the present invention has a negative film setter 62 which carry out an interruption processing in place of the negative film setter 12 (see FIG. 3) according to the first embodiment of the present invention. In the second embodiment of the present invention, portions identical to those in the first embodiment of the present invention are denoted by the same reference numerals and description thereof will be omitted.

The negative film setter 62 comprises film holders 66A to 66E respectively having push button switches 64A to 64E for indicating an interruption processing, in place of the film holders 16A to 16E (see FIG. 3) according to the first embodiment of the present invention. The switches 64A to 64E are provided at upper portions of the film holders 66A to 66E, respectively.

When one of the switches is turned on, a film in the film holder having the switch is fed with priority to other films. More specifically, as shown in FIG. 5, when the switch 64C at the upper portion of the film holder 66C is turned on during the feeding of the film F1 from the film holder 66A after the feeding of the film F1 is completed, due to an instruction by the controller 24, the negative film setter 62 is slidingly moved so that the film F3 which is set in the film holder 66C can be conveyed to the conveying port of the negative film feeder.

After the feeding of the film F3 is completed, the negative film setter 62 is slidingly moved so that the film F2, which had been scheduled to be fed after the film F1, can be conveyed to the conveying port of the negative film feeder, and the film F2 is fed.

In accordance with the present embodiment, interruption processing can be performed quickly from any film holder.

(Third Embodiment)

Figure 6:
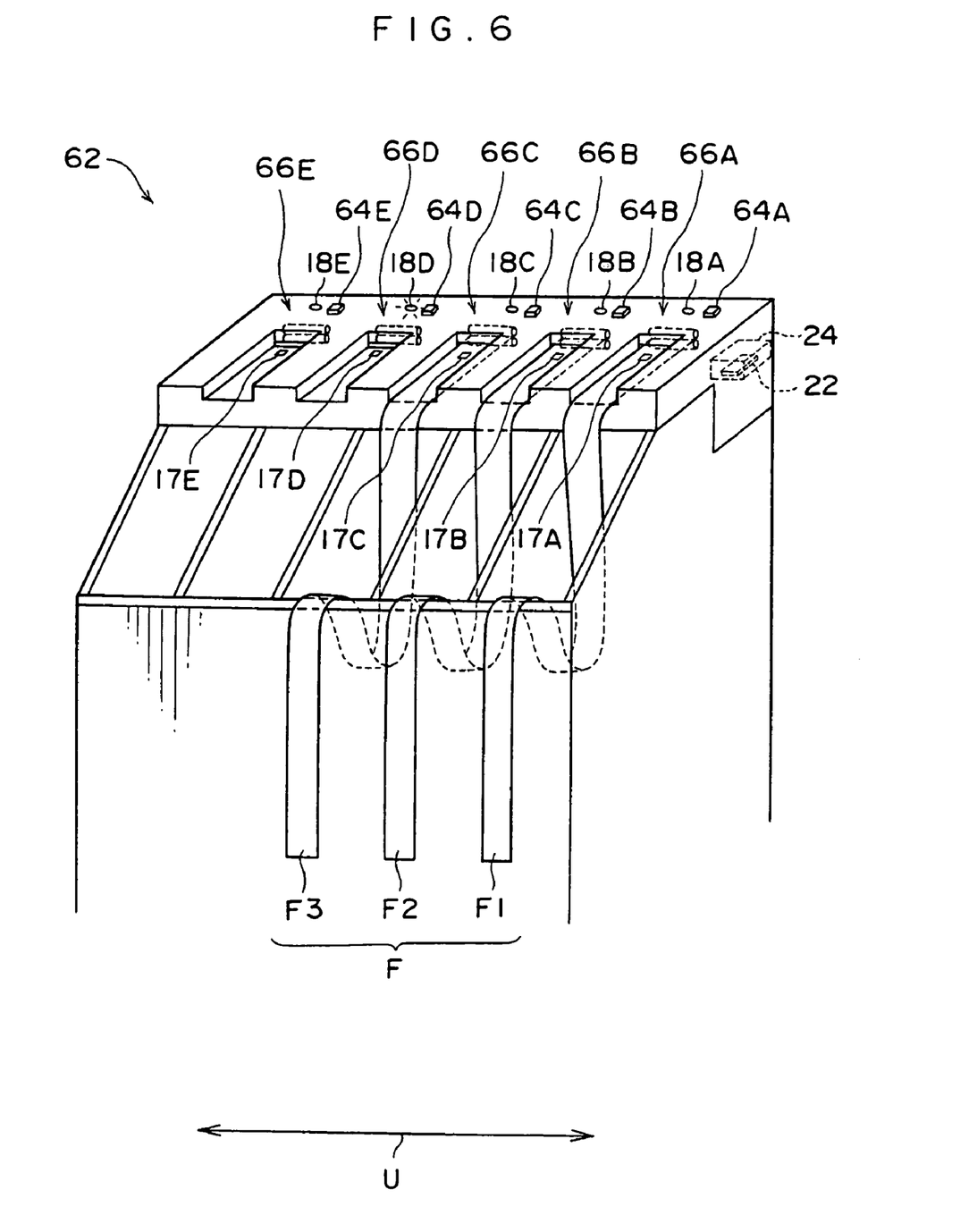
FIG. 6 is a perspective view illustrating a negative film setter of an image reading apparatus according to a third embodiment of the present invention.

As shown in FIG. 6, an image reading apparatus according to a third embodiment of the present invention is structured in the same manner as in the second embodiment of the present invention except for an operation of lamps of the negative film setter. In the third embodiment of the present invention, portions identical to those in the second embodiment of the present invention are denoted by the same reference numerals and description thereof will be omitted.

In the third embodiment of the present invention, on the basis of the contents stored in the memory 22, the controller 24 of the negative film setter 62 determines which film holder sets therein a film to be processed last. Then, among film holders in which films are not set ("empty film holders" hereinafter), a film holder in the closest vicinity of the film holder that accommodates therein a film to be processed last is selected, and a lamp of the film holder is lit.

As shown in FIG. 6, more specifically, when the film F1, the film F2, and the film F3 are respectively set in the sequential order in the film holder 66A, 66B, and 66C, the controller 24 determines that the film F3 which is set in the film holder 66C is to be processed last. Here, the empty film holders are the film holders 66D and 66E.

Since the film holder 66D is disposed closer to the film holder 66C than the film holder 66E, the controller 24 selects the film holder 66D, and lights the lamp 64D.

Consequently, a user can determine at a glance in which film holder a film should be set in order to finish processing all of the films in the shortest period of time. The present invention can exhibit a considerably great effect that a processing time can be significantly reduced, particularly when a moving rate at which the negative film setter 62 moves in a U direction is low.

While this invention has been described in conjunction with the exemplary embodiments outlined above, it is evident that many alternatives, modifications and variations will be apparent to those skilled in the art. Various changes may be made without departing from the spirit and scope of the invention. For example, instead of a negative film, films of other types also can be applied to the invention. Further, the exemplary embodiments of the invention, as set forth above, are intended to be illustrative, not limiting.

What is claimed is:

1. A film feeding device comprising:
    a plurality of film holders for feeding films which are set therein,
    wherein each of the plurality of film holders includes a film presence and absence detecting section for detecting whether or not the film is set, and a film-presence indicating section for indicating whether or not the film is set upon receipt of a signal from the film presence and absence detecting section.

2. The film feeding device according to claim 1, wherein at least one of the plurality of film holders is an interruption holder in which a film to be processed for interruption is set.

3. The film feeding device according to claim 2, further comprising a storage unit for storing a sequential order in which films have been set in the plurality of film holders, wherein the films are fed in accordance with the sequential order stored in the storage unit, and, when a film to be processed for interruption is set, the film to be processed for interruption is fed with priority to other films.

4. The film feeding device according to claim 1, wherein each of the plurality of film holders includes a switch for indicating interruption processing.

5. The film feeding device according to claim 4, further comprising a storage unit for storing a sequential order in which films have been set in the plurality of film holders, wherein films are fed in accordance with the sequential order stored in the storage unit, and when a film to be processed for interruption is set, the film to be processed for interruption is fed with priority to other films.

6. The film feeding device according to claim 4, further comprising a storage unit for storing a sequential order in which films have been set in the plurality of film holders upon receipt of signals from the film presence and absence detecting section, wherein, when one of the switches is switched on, a film of a film holder having the switch is fed with priority to the other films.

7. The film feeding device according to claim 1, further comprising a controller having a storage unit for storing a sequential order in which films have been set in the plurality of film holders upon receipt of signals from the film presence and absence detecting section, wherein the controller feeds the films in accordance with the sequential order stored in the storage unit.

8. The film feeding device according to claim 1, wherein the film is a negative film.

9. The film feeding device according to claim 1, wherein the film feeding device is movable so that a position at which a film is fed can be fixed.

10. A film feeding device including a plurality of film holders for feeding films which are set therein, the film feeding device comprising:
   a holding mechanism for holding the plurality of film holders so that a position at which a film is fed can be fixed;
   a determination section for determining, in which film holder a film to be processed last is set; and
   a display section for displaying a film holder in which no film is set in the closest vicinity of a film holder that was determined by the determination section to have set therein the film to be processed last.

11. The film feeding device according to claim 10, wherein at least one of the plurality of film holders is an interruption holder in which a film to be processed for interruption is set.

12. The film feeding device according to claim 11, further comprising a storage unit for storing a sequential order in which films have been set in the plurality of film holders, wherein films are fed in accordance with the sequential order stored in the storage unit, and when a film to be processed for interruption is set, the film to be processed for interruption is fed with priority to other films.

13. The film feeding device according to claim 10, wherein each of the plurality of film holders includes a switch for indicating an interruption processing.

14. The film feeding device according to claim 13, further comprising a storage unit for storing a sequential order in which films have been set in the plurality of film holders, wherein the films are fed in accordance with the sequential order stored in the storage unit, and, when a film to be processed for interruption is set, the film to be processed for interruption is fed with priority to other films.

15. The film feeding device according to claim 13, further comprising a storage unit for storing a sequential order in which films have been set in the plurality of film holders, wherein, when one of the switches is switched on, the film of a film holder having the switch is fed with priority to other films.

16. The film feeding device according to claim 10, wherein the holding mechanism allows the film feeding device to be movable in a direction substantially orthogonal to a direction in which a film is fed.

17. An image reading apparatus comprising:
   a film feeding device including a plurality of film holders for feeding films which are set therein, each of the plurality of the film holders including a film presence and absence detecting section for detecting whether or not a film is set, and a film-presence indicating section for indicating whether or not the film is set upon receipt of a signal from the film presence and absence detecting section; and
   an image reading section for reading the image reading apparatus reads an image fed from the film feeding device.

18. The image reading apparatus according to claim 17, further comprising a feeder for conveying the film fed from the film feeding device, wherein the feeder includes a leading and trailing edge detecting section for detecting passage of at least one of a leading edge and a trailing edge, and transmitting to the film feeding device a detection signal indicating that the at least one of the leading edge and the trail edge has passed the leading and trailing edge detecting section.

19. The image reading apparatus according to claim 17, wherein the film feeding device is movable so that a position at which a film is fed can be fixed.

20. An image reading apparatus comprising:
   a film feeding device including a plurality of film holders for feeding films which are set therein, the film feeding device including a holding mechanism for holding the plurality of film holders so that a position at which a film is fed can be fixed, a determination section for determining, in which film holder a film to be processed last is set, and a display section for displaying a film holder in which no film is set in the closest vicinity of a film holder that was determined by the determination section to have set therein the film to be processed last; and
   an image reading section for reading an image of a film fed from the film feeding device.

* * * * *